(12) United States Patent
Kim (10) Patent No.: US 9,637,119 B2
(45) Date of Patent: May 2, 2017

(54) SAFE DRIVING GUIDING SYSTEM AND METHOD THEREOF

(71) Applicant: HYUNDAI MOBIS Co., Ltd., Seoul (KR)

(72) Inventor: Jeong Ku Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 14/739,446

(22) Filed: Jun. 15, 2015

(65) Prior Publication Data

US 2015/0360686 A1 Dec. 17, 2015

(30) Foreign Application Priority Data

Jun. 16, 2014 (KR) .................. 10-2014-0072832

(51) Int. Cl.
| | | |
|---|---|---|
| *G01C 22/00* | (2006.01) | |
| *B60W 30/09* | (2012.01) | |
| *G08G 1/16* | (2006.01) | |
| *B60W 50/14* | (2012.01) | |

(52) U.S. Cl.
CPC ............ *B60W 30/09* (2013.01); *B60W 50/14* (2013.01); *G08G 1/167* (2013.01); *B60W 2550/10* (2013.01); *B60W 2720/24* (2013.01)

(58) Field of Classification Search
USPC ......................................................... 701/23
See application file for complete search history.

(56) References Cited

U.S. PATENT DOCUMENTS

| | | | | |
|---|---|---|---|---|
| 2005/0125121 | A1* | 6/2005 | Isaji | ............ B60W 30/08 701/36 |
| 2008/0238718 | A1* | 10/2008 | Jung | ............ B62D 15/025 340/901 |
| 2012/0062745 | A1* | 3/2012 | Han | .............. B62D 15/029 348/148 |
| 2012/0271540 | A1* | 10/2012 | Miksa | ............ G01C 21/30 701/409 |
| 2013/0085975 | A1* | 4/2013 | Wellhoefer | ......... B60R 21/0134 706/46 |
| 2013/0226431 | A1* | 8/2013 | Lu | .................... B60W 50/0098 701/96 |
| 2014/0035738 | A1* | 2/2014 | Kim | .............. G08G 1/167 340/435 |
| 2014/0063250 | A1* | 3/2014 | Park | .............. H04N 5/23206 348/148 |

FOREIGN PATENT DOCUMENTS

| | | | |
|---|---|---|---|
| JP | 3153839 B2 | 4/2001 | |
| KR | 10-2011-0062439 A | 6/2011 | |

* cited by examiner

*Primary Examiner* — Hussein A. Elchanti
(74) *Attorney, Agent, or Firm* — NSIP Law (57) ABSTRACT

Provided is a safe driving guiding system. The safe driving guiding system includes: a vehicle-drivable space extracting unit configured to extract a vehicle-drivable space by using distance information from a vehicle to an object detected by a distance measuring sensor and a vehicle-drivable space by using object information detected by an object detecting sensor; a dynamic driving space extracting unit configured to extract a dynamic driving space by using movement information of a vehicle detected by a movement detecting sensor; and an accident occurrence predicting unit configured to determine an overlap degree between the vehicle-drivable space and the dynamic driving space, and control initiation of an operation of at least one of a lane departure warning system and a lane keeping assistance system.

20 Claims, 6 Drawing Sheets

SAFE DRIVING GUIDING SYSTEM AND METHOD THEREOF

CROSS-REFERENCE TO RELATED APPLICATIONS

This application claims priority under 35 U.S.C. §119 to Korean Patent Application No. 10-2014-0072832, filed on Jun. 16, 2014, in the Korean Intellectual Property Office, the disclosure of which is incorporated herein by reference in its entirety.

TECHNICAL FIELD

The present invention relates to a safe driving guiding system and a method thereof, and more particularly, to a safe driving guiding system and a method thereof, which guides a driver insensitively reacting to a change in an external environment of a vehicle for safe driving.

BACKGROUND

A driver has an ability to recognize a surrounding situation of a vehicle, but when the driver repeatedly drives, his/her concentration falls. When the driver's concentration falls, the driver cannot unconsciously recognize a movement of his/her vehicle. In this situation, the driver cannot recognize a dangerous situation, so that an accident occurrence probability is high. Particularly, an accident occurrence probability by a driver, who is insensitive to a change in a surrounding environment of a vehicle, is higher.

In order to alleviate the problem, an assistance system capable of assisting driving is mounted in a vehicle, and examples thereof include a lane departure warning system (LDWS) and a lane keeping assistance system (LKAS).

As is well known, the LDWS is a system warning a driver of a lane departure situation of a vehicle, and notifies a driver of a dangerous situation of a vehicle only when the vehicle deviates a lane without considering a movement of the vehicle occurring in a situation where the driver cannot recognize the dangerous situation, so that the LDWS is not a solution capable of fundamentally solving the aforementioned problem.

The LKAS is a system for automatically controlling a driving direction (or a travel direction) of a vehicle into an inner side of a lane when the vehicle deviates from the lane, but is stably operated only when a movement of the vehicle is normal, so that the LKAS cannot prevent an accident from occurring in an abnormal situation.

SUMMARY

An exemplary embodiment of the present invention provides a system for guiding safe driving, including: a vehicle-drivable space extracting unit configured to extract a vehicle-drivable space by using distance information from a vehicle to an object detected by a distance measuring sensor and a vehicle-drivable space by using object information detected by an object detecting sensor; a dynamic driving space extracting unit configured to extract a dynamic driving space by using movement information of a vehicle detected by a movement detecting sensor; and an accident occurrence predicting unit configured to determine an overlap degree between the vehicle-drivable space and the dynamic driving space, and control initiation of an operation of at least one of a lane departure warning system and a lane keeping assistance system.

Another exemplary embodiment of the present invention provides a method of guiding safe driving of a vehicle, including: extracting a vehicle-drivable space by using distance information from a vehicle to an object detected by a distance measuring sensor and a vehicle-drivable space by using object information detected by an object detecting sensor; extracting a dynamic driving space by using movement information of the vehicle detected by a movement detecting sensor; and determining an overlap degree between the vehicle-drivable space and the dynamic driving space, and controlling initiation of an operation of at least one of a lane departure warning system and a lane keeping assistance system according to a result of the determination of the overlap degree.

Other features and aspects will be apparent from the following detailed description, the drawings, and the claims.

DETAILED DESCRIPTION OF EMBODIMENTS

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
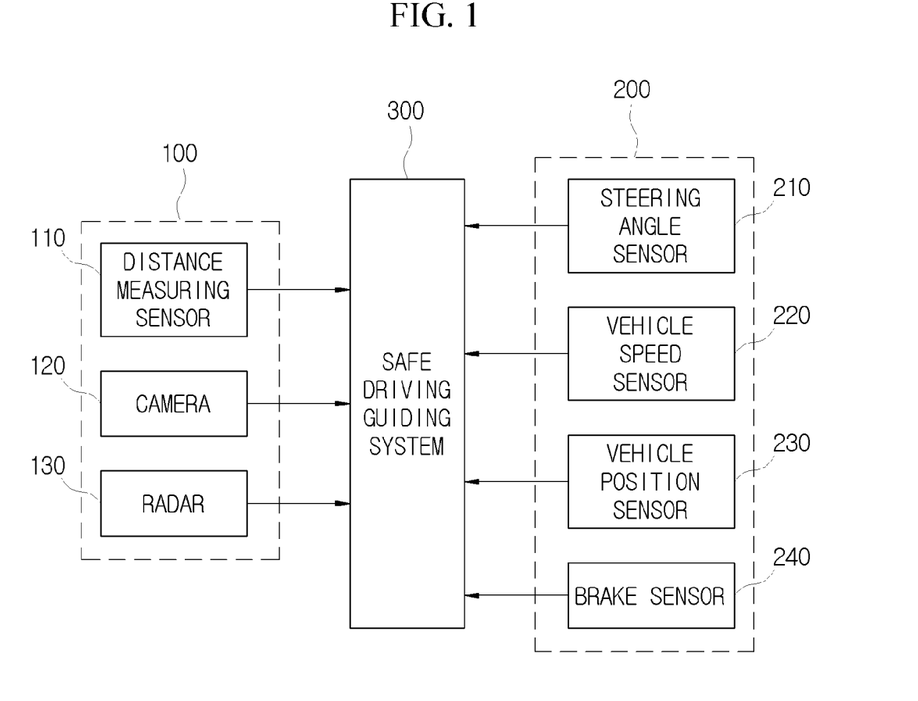
FIG. 1 is a block diagram illustrating a configuration of an entire system according to an exemplary embodiment of the present invention.

FIG. 1 is a block diagram illustrating a configuration of an entire system including a safe driving guiding system according to an exemplary embodiment of the present invention.

Referring to FIG. 1, an entire system according to an exemplary embodiment of the present invention includes an environment detecting sensor 100, a movement detecting sensor 200, and a safe driving guiding system 300.

Environment Detecting Sensor 100

The environment detecting sensor 100 is installed in a vehicle, and detects a road structure and an obstacle in order to detect a vehicle-drivable space, in which a vehicle may drive (or travel). Here, the road structure is a structure usable for recognizing a road profile, and may include streetlamps and street trees periodically disposed at both sides of a road, various structures installed in a bus station, and the like. The obstacle may be a pedestrian walking on a sidewalk.

In order to detect a vehicle-drivable space, the environment detecting sensor 100 includes a distance measuring sensor 110, a camera sensor 120, and a radar sensor 130.

The distance measuring sensor 110 is a sensor installed in a vehicle and measuring a distance value to a road structure and/or an obstacle, and may include a laser scanner, an ultrasonic sensor, and the like.

The camera sensor 120 is installed in a vehicle, and photographs a road structure and/or an obstacle around the vehicle, and detects information about the object, such as the road structure and/or the obstacle, from information about the photographed image. To this end, the camera sensor 120 may include a camera photographing a road structure and an obstacle, and an object detecting unit extracting an object (the road structure and/or the obstacle) from image information obtained by the camera. Here, the object detecting unit may extract the road structure or the obstacle from the image information by executing various image processing algorithms. The radar sensor 130 is installed in the vehicle, and detects object information obtained by detecting a road structure and/or an obstacle by using radar.

The camera sensor 120 and the radar sensor 130 may be called object detecting sensors.

Movement Detecting Sensor 200

The movement detecting sensor 200 is installed in the vehicle, and detects an expected movement space of the vehicle by detecting a movement of the vehicle.

To this end, the movement detecting sensor 200 includes a plurality of sensors detecting a movement of the vehicle, for example, a steering angle sensor 210 sensing steering angle information, a vehicle speed sensor 220 sensing a vehicle speed, a vehicle position sensor 230 sensing a vehicle position, and a brake sensor 240 sensing brake force.

Safe Driving Guiding System 300

The safe driving guiding system 300 compared a result of the detection by the environment detecting sensor 100 and a result of the detection by the movement detecting sensor 200, and determines whether a driver recognize a dangerous situation.

Further, the safe driving guiding system 300 operates a lane keeping assistance system (LKAS) according to a result of the determination on whether the driver recognizes the dangerous situation.

Further, the safe driving guiding system 300 operates a lane departure warning system (LDWS) according to a result of the determination. The safe driving guiding system 300 will be described in detail with reference to FIG. 2.

Figure 2:
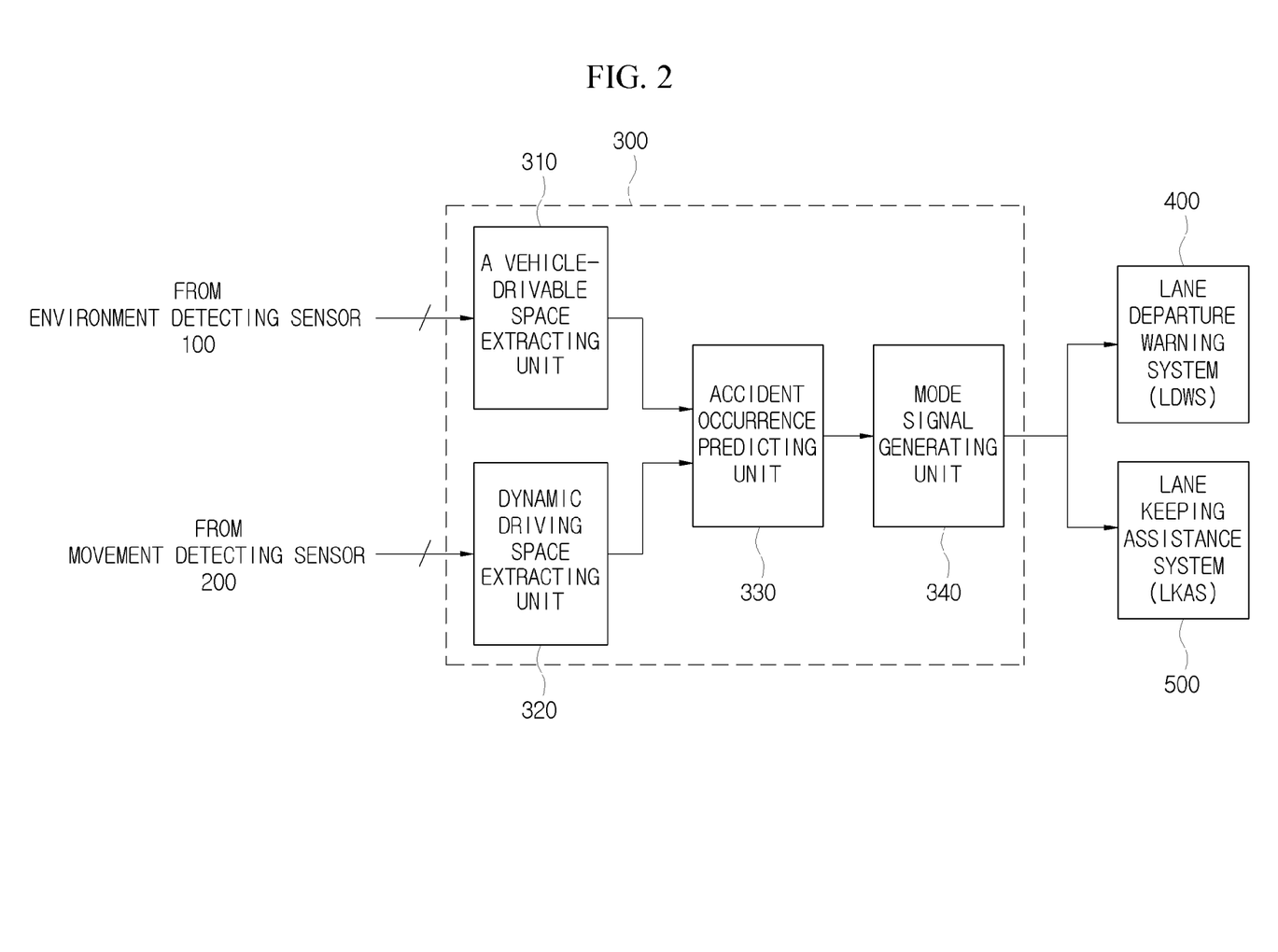
FIG. 2 is a block diagram illustrating a configuration of a safe driving guiding system illustrated in FIG. 1.

FIG. 2 is a block diagram illustrating the safe driving guiding system according to the exemplary embodiment of the present invention.

Referring to FIG. 2, the safe driving guiding system 300 includes a vehicle-drivable space extracting unit 310, a dynamic driving space extracting unit 320, an accident occurrence predicting unit 340, and a mode signal generating unit 340.

Vehicle-Drivable Space Extracting Unit 310

The vehicle-drivable space extracting unit 310 generates a road profile map, and extracts a vehicle-drivable space from the generated road profile map. Hereinafter, the vehicle-drivable space extracting unit 310 will be described in detail with reference to FIG. 3.

Figure 3:
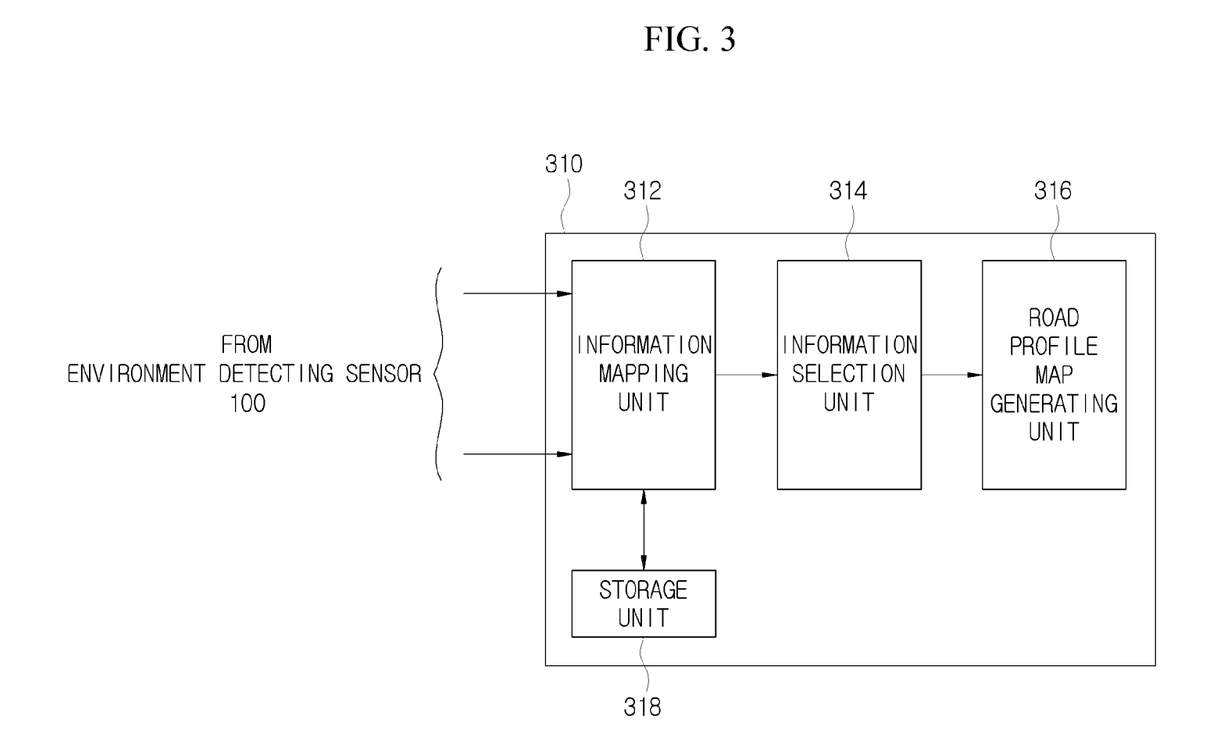
FIG. 3 is a block diagram illustrating a configuration of a vehicle-drivable space extracting unit illustrated in FIG. 2.

Referring to FIG. 3, in order to generate the road profile map, the vehicle-drivable space extracting unit 310 includes an information mapping unit 312, an information selection unit 314, a road profile map generating unit 316, and a storage unit 318.

The information mapping unit 312 maps distance information measured by the distance measuring sensor 100 and object information measured by the camera sensor 120 and the radar sensor 130 by using a coordinate conversion table stored in the storage unit.

Since the distance measuring sensor 100, the camera sensor 120, and the radar sensor 130 use different coordinate systems, the distance information obtained by the distance measuring sensor 100, the object information obtained by the camera sensor 120, and the object information obtained by the radar sensor 130 need to be mapped.

The mapping operation includes a processing process of indicating the distance information indicated in a distance coordinate system used by the distance measuring sensor 110, the object information indicated in a camera coordinate system used by the camera sensor 120, and the object information indicated in a radar coordinate system used by the radar sensor 130 in one common coordinate system.

Further, the mapping operation includes a processing process of processing the distance information and the object information located at a close distance in the common coordinate system as one piece of mapping information. Each of the distance information and the object information in the common coordinate system is indicated in a coordinate form. In this case, a coordinate value indicating the distance information and a coordinate value indicating the object information are located within a predetermined distance, the corresponding distance information and object information are mapped.

For the mapping operation, the coordinate conversion table stored in the storage unit 318 is used.

The coordinate conversion table is a table recording a common coordinate value of the common coordinate system corresponding to each of a coordinate value of the distance coordinate system, a coordinate value of the camera coordinate system, and a coordinate value of the radar coordinate system, and the information mapping unit 312 converts the distance information indicated in the distance coordinate system, the object information indicated in the camera coordinate system, and the object information indicated in the radar coordinate system into one common coordinate system by referring to the coordinate conversion table.

The information mapping unit 312 configures a pair of distance information and object information located at the closest distance in the common coordinate system as one piece of mapping information. Accordingly, it is possible to map the object information detected by the camera sensor and the radar sensor and the distance information detected by the distance measuring sensor. For convenience of the description, the mapped distance information and object information is referred to as mapping information.

The information selecting unit 314 selects information necessary for recognizing a road profile from the mapping information mapped by the information mapping unit 312.

Since the distance measuring sensor, the camera sensor, and the radar sensor detect even information unnecessary for generating the road profile, the unnecessary information needs to be filtered. For example, surrounding vehicles driving (or travelling) the same road as that of the vehicle are unnecessary information for recognizing the road profile.

By contrast, road structures, such as street trees, streetlamps, and bus stations periodically disposed with a predetermined distance around the road are information necessary for recognizing the road profile.

In order to select the information necessary for recognizing the road profile, the distance information included in the mapping information may be used. That is, the object information mapped to the periodically detected distance information is a highly probable road structure, such as street trees, streetlamps, and bus stations, so that the periodically detected distance information may be used as information necessary for recognizing the road profile.

The road profile map generating unit 316 generates a road profile map by using mapping information selected by the information selecting unit 314, and extracts a vehicle-drivable space from the generated road profile map.

The road profile map generating unit 316 generates the road profile map by disposing an object (a road structure or an obstacle) included in the mapping information selected by the information selection unit 314 according to the distance information.

Figure 5:
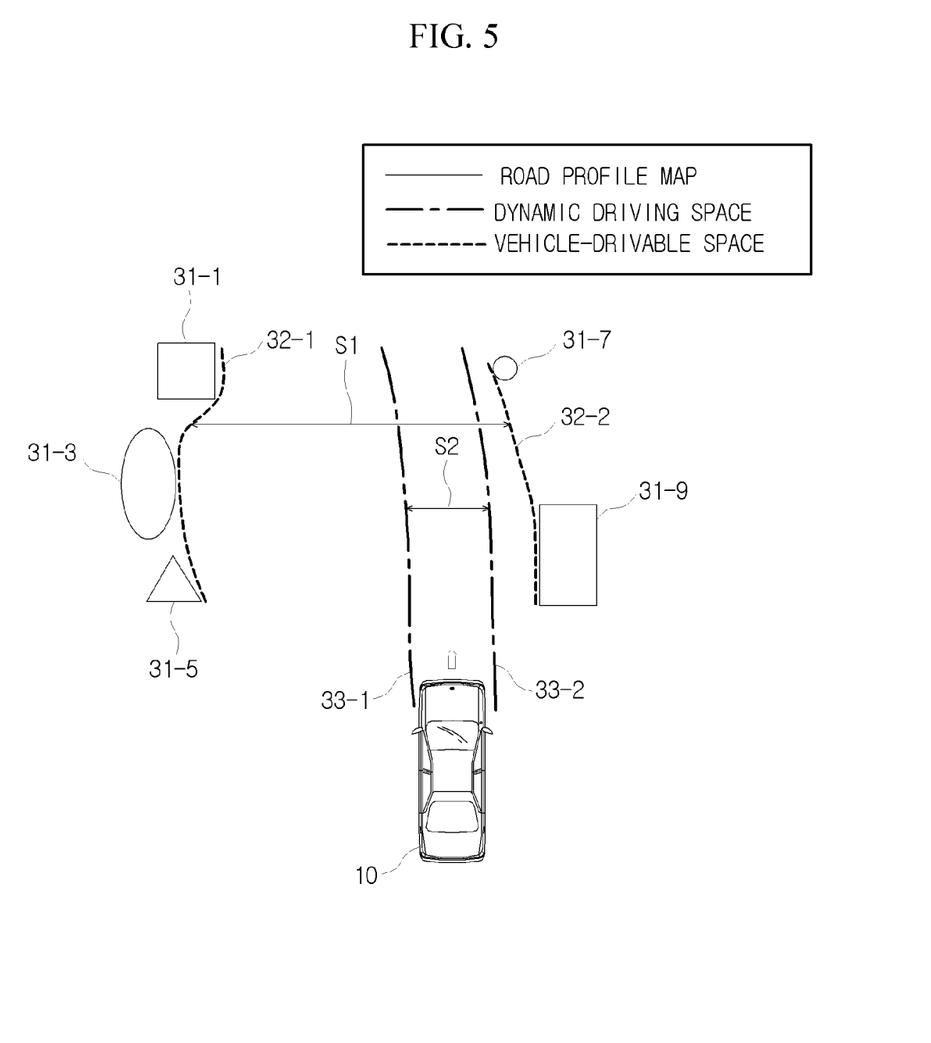
FIG. 5 is a diagram illustrating a vehicle-drivable space and a dynamic driving space indicated on a road profile map according to an exemplary embodiment of the present invention.

As illustrated in FIG. 5, the road profile map is a map indicating only a disposition form of objects 31-1, 31-3, 31-5, 31-7, and 31-9 on the common coordinate system, so that the road profile map is different from a vehicle-drivable space of the vehicle. Accordingly, a processing process of indicating a vehicle-drivable space in the road profile map is necessary.

In order to indicate a vehicle-drivable space in the road profile map, the road profile map generating unit 316 performs a processing process of connecting objects (road structures or obstacles) corresponding to the mapping information selected by the information selecting unit 314 with one line.

Particularly, as illustrated in FIG. 5, the road profile map generating unit 316 connects objects 31-1, 31-3, and 31-5 shown at a front-left side of a vehicle 10 in the road profile map among the objects corresponding to the mapping information with one line 32-1, and objects 31-7 and 31-9 shown at a front-right side of the vehicle with another line 32-2. A space between one line 32-1 and another line 32-2 is expressed as a vehicle-drivable space S1.

When the vehicle-drivable space is expressed in the road profile map as described above, the road profile map generating unit 316 extracts the vehicle-drivable space S1 from the road profile map.

Dynamic Driving Space Extracting Unit 320

The dynamic driving space extracting unit 320 generates a dynamic driving map, and extracts a dynamic driving space from the dynamic driving map. Hereinafter, the dynamic driving space extracting unit 320 will be described in detail with reference to FIG. 4.

Figure 4:
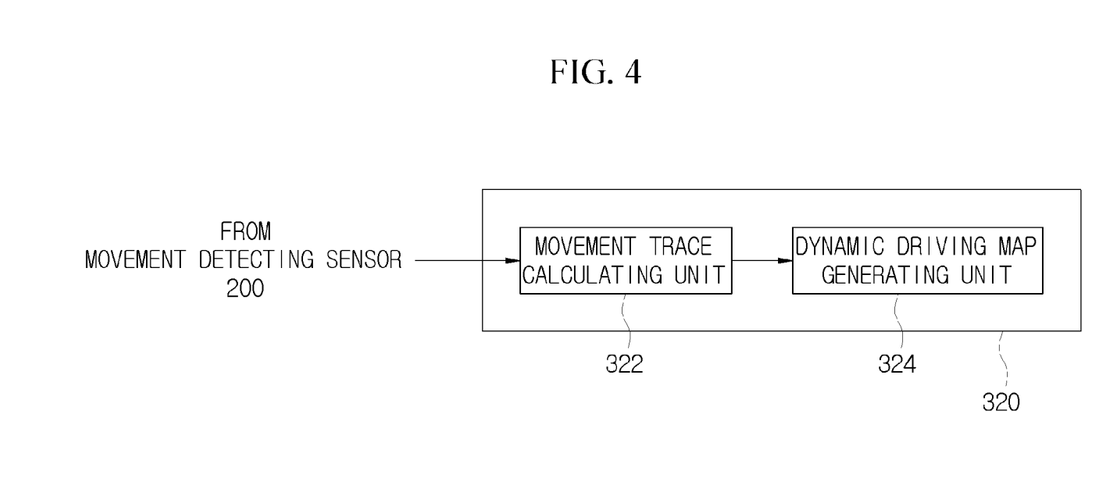
FIG. 4 is a block diagram illustrating a configuration of a dynamic driving space extracting unit illustrated in FIG. 2.

Referring to FIG. 4, the dynamic driving space extracting unit 320 includes a movement trace calculating unit 322 and a dynamic driving map generating unit 324.

The movement trace calculating unit 322 calculates a movement trace by using movement information of the vehicle including steering angle information, vehicle speed information, vehicle position information, and brake information obtained from the movement detecting sensor 200.

The dynamic driving map generating unit 324 generates a dynamic driving map by performing the processing process of expressing the coordinate value indicating the movement trace calculated by the movement trace calculating unit 322 in the common coordinate system by referring to the coordinate conversion table stored in the storage unit 318 illustrated in FIG. 3.

In the meantime, the movement trace expressed in the common coordinate system is expressed in a form of one line, so that the movement trace is different from a dynamic driving space.

Accordingly, in order to re-express the movement trace expressed in the form of one line in a space form, as illustrated in FIG. 5, the dynamic driving map generating unit 324 performs a processing process of expressing the movement trace re-expressed by one line with two lines 33-1 and 33-2 having a width of the vehicle. Through the processing process, the dynamic driving map generating unit 324 extracts a space between the two lines 33-1 and 33-2 as a dynamic driving space S2.

Accident Occurrence Predicting Unit 330

Referring back to FIG. 2, the accident occurrence predicting unit 330 determines an overlap degree between the vehicle-drivable space S1 extracted by the vehicle-drivable space extracting unit 310 and the dynamic driving space S2 extracted by the dynamic driving space extracting unit 320, and controls initiation of an operation of at least one of a lane departure warning system (LDWS) 400 and a lane keeping assistance system (LKAS) 500 according to a result of the determination.

Particularly, as illustrated in FIG. 5, when the dynamic driving space S2 is completely included in the vehicle-drivable space S1, the vehicle currently safely drives (or travels) within the vehicle-drivable space S1, so that the accident occurrence predicting unit 330 generates a first determination result indicating a low accident occurrence probability.

When a partial area of the dynamic driving space S2 is included in the vehicle-drivable space S1, and the partial area is equal to or larger than a predetermined area, the vehicle currently slightly deviates from the vehicle-drivable space S1, so that the accident occurrence predicting unit 330 generates a second determination result indicating a high accident occurrence probability.

When a partial area of the dynamic driving space S2 is included in the vehicle-drivable space S1, and the partial area is smaller than a predetermined area, the vehicle currently considerably deviates from the vehicle-drivable space S1, so that the accident occurrence predicting unit 330 generates a third determination result indicating a very high accident occurrence probability.

Mode Signal Generating Unit 340

The mode signal generating unit 340 generates a mode signal instructing an operation of at least one of the LDWS 400 and the LKAS 500 according to the determination result of the accident occurrence predicting unit 330.

Particularly, when the mode signal generating unit 340 receives the first determination result from the accident occurrence predicting unit 330, the mode signal generating unit 340 generates a first mode signal for converting a mode of the vehicle into a manual driving mode according to the first determination result, and outputs the generated first mode signal to the LKAS 500. Accordingly, the LKAS 500 is turned off, and the vehicle drives in the manual driving mode dependent on the driving of the driver.

When the mode signal generating unit 340 receives the second determination result from the accident occurrence predicting unit 330, the mode signal generating unit 340 generates a second mode signal for warning a driver that an accident occurrence probability is high, and outputs the generated second mode signal to the LDWS 400 according to a result of the second determination. Accordingly, the LDWS 400 provides the driver with a warning message warning that an accident occurrence probability is high through an image output device or a voice output device.

When the mode signal generating unit 340 receives the third determination result from the accident occurrence predicting unit 330, the mode signal generating unit 340 generates a third mode signal for converting a mode of the vehicle into an automatic driving mode according to the third determination result, and outputs the generated third mode signal to the LKAS 500. Accordingly, the LKAS 500 starts to be operated, and the vehicle drives in the automatic driving mode by the LKAS 500.

As described above, the safe driving guiding system according to the exemplary embodiment of the present invention extracts a vehicle-drivable space and a dynamic driving space, and predicts a collision of a vehicle according to an overlap degree between the vehicle-drivable space and the dynamic driving space. Accordingly, it is possible to prevent an accident occurring in an environment in which it is difficult for a driver insensitive to a surrounding environment of the vehicle to control the vehicle.

Figure 6:
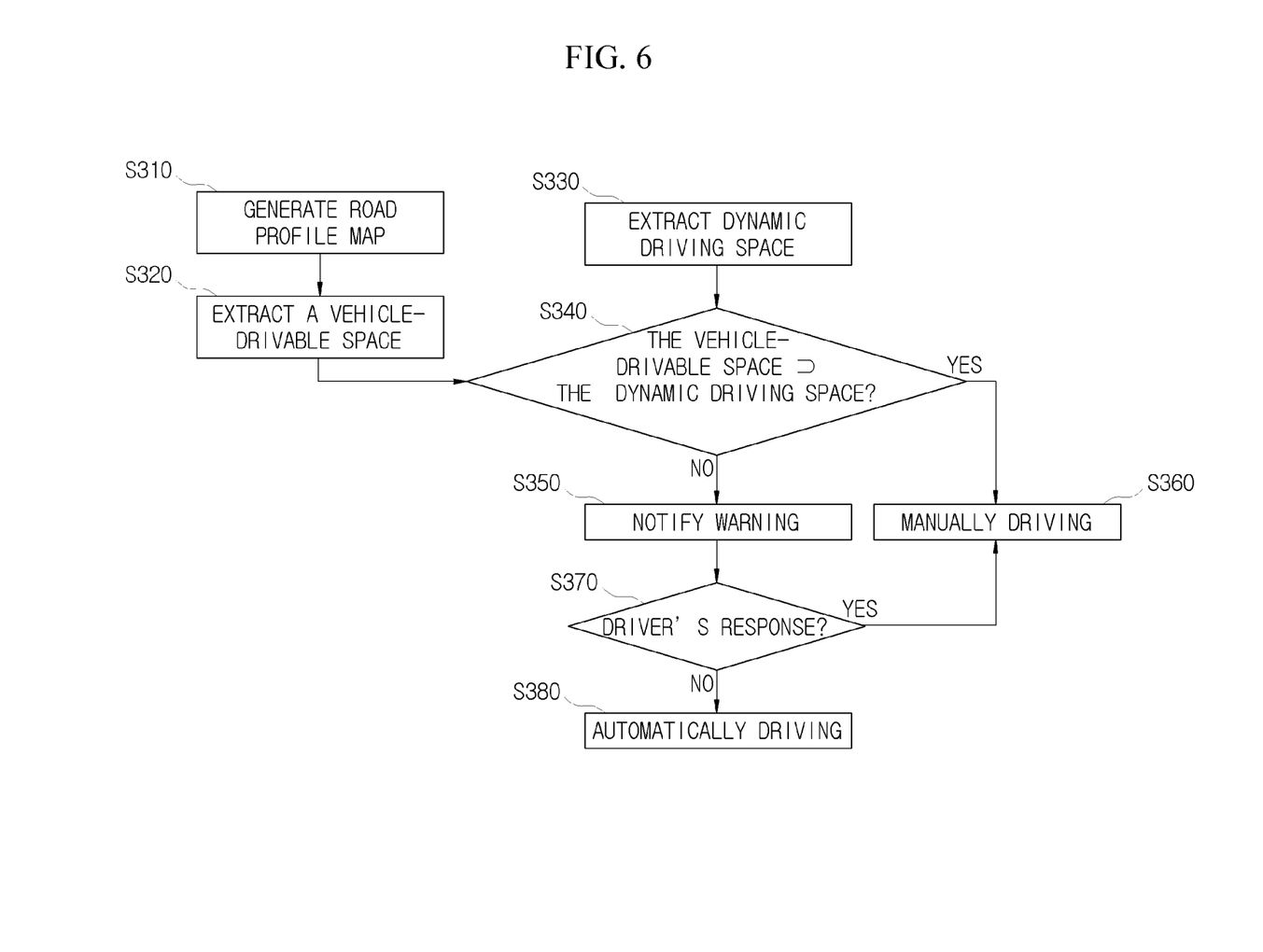
FIG. 6 is a flowchart illustrating a safe driving guiding method using the safe driving guiding system according to an exemplary embodiment of the present invention.

FIG. 6 is a flowchart illustrating a safe driving guiding method using the safe driving guiding system according to an exemplary embodiment of the present invention. For simplification of the description, it is assumed that a subject performing each operation below is the safe driving guiding system 300 not otherwise mentioned. Further, in the description of each operation below, contents overlapping those described with reference to FIGS. 1 to 5 will be briefly described.

Referring to FIG. 6, in operation S310, the safe driving guiding system 300 generates a road profile map using distance information to an object detected by the distance measuring sensor, and object information detected by the object detecting sensor, such as the camera sensor and the radar sensor.

Next, in operation S320, the safe driving guiding system 300 expresses a vehicle-drivable space within the generated road profile map, and extracts the expressed vehicle-drivable space.

Next, in operation 330, the safe driving guiding system 300 calculates a movement trace of the vehicle by using movement information detected by the movement detecting sensor, and extracts a dynamic driving space from the calculated movement trace.

Next, in operation 340, the safe driving guiding system 300 determines an overlap degree between the vehicle-drivable space and the dynamic driving space.

Particularly, when a partial area of the dynamic driving space S2 is included in the vehicle-drivable space S1, and the partial area is smaller than a predetermined area, the safe driving guiding system 300 performs operation S350, and when the dynamic driving space S2 is completely included in the vehicle-drivable space S1, the safe driving guiding system 300 performs operation S360.

When the partial area of the dynamic driving space S2 included in the vehicle-drivable space S1 is equal to or larger than the predetermined area, the LDWS 400 notifies a driver of a warning message warning that an accident occurrence probability is high through the image output device or the voice output device in operation S350.

In operation S360, when the dynamic driving space S2 is completely included in the vehicle-drivable space S1, the safe driving guiding system 300 controls the LKAS 500 to be in an operation standby state. In this case, the vehicle drives in a manual driving mode dependent on the driving manipulation by the driver.

In operation S370, when there is no response from the driver even though the LDWS 400 notifies the driver of the warning message, that is, an overlap area of the vehicle-drivable space S1 and the dynamic driving space S2 is gradually decreased, so that the partial area of the dynamic driving space S2 included in the vehicle-drivable space S1 is smaller than the predetermined area, the safe driving guiding system 300 operates the LKAS 500. In this case, the vehicle drives (or travels) in an automatic driving mode dependent on automatic driving of the LKAS 500.

According to the present invention, it is possible to prevent an accident occurring in a situation in which it is difficult for a driver insensitive to a change in a surrounding environment of the vehicle to control the vehicle.

The configuration and the method of the exemplary embodiments of the present invention are not limited applied, but the entirety or a part of each exemplary embodiment may be selectively combined and configured so that the exemplary embodiments may be variously modified.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A system of a vehicle for guiding safe driving of the vehicle, the system comprising:
an object detecting sensor configured to detect object information of an object;
a distance measuring sensor configured to detect distance information between the vehicle and the object;
a movement detecting sensor configured to detect movement information of the vehicle; and
one or more processors configured to:
extract a vehicle-drivable space, between the vehicle and the object, using the distance information and the object as the vehicle is driven;
extract a dynamic driving space using the movement information; and determine an overlap degree between the vehicle-drivable space and the dynamic driving space, and control initiation of an operation of one or both of a lane departure warning system and a lane keeping assistance system, based on the overlap degree,
wherein the extracting of the dynamic driving space comprises calculating a movement trace of the vehicle using the movement information, expressing coordinate values of two lines, based on the movement trace and spaced by a width of the vehicle, and extracting a space between the two lines as the dynamic driving space.

2. The system of claim 1, wherein the one or more processors is further configured to, in response to the dynamic driving space being determined to be completely included in the vehicle-drivable space based on the overlap degree, control the lane keeping assistance system to be in an operation standby state.

3. The system of claim 1, wherein the one or more processors is further configured to, in response to a partial area of the dynamic driving space being determined to be completely included in the vehicle-drivable space and the partial area being equal to or larger than a predetermined area, based on the overlap degree, instruct the operation of the lane departure warning system.

4. The system of claim 1, wherein the one or more processors is further configured to, in response to a partial area of the dynamic driving space being determined to be included in the vehicle-drivable space and the partial area being smaller than a predetermined area, based on the overlap degree instruct the operation of the lane keeping assistance system.

5. The system of claim 1, wherein the extracting of a vehicle-drivable space comprises:
indicating the distance information and the object information in a common coordinate system by referring to a coordinate conversion table, and configuring mapping information comprising the distance information and the object information closest to the distance information in the common coordinate system;
selecting mapping information comprising distance information periodically detected by the distance measuring sensor and object information closest to the periodically detected distance information among the mapping information; and
generating a road profile map using the distance information and the object information included in the selected mapping information, and extracting the vehicle-drivable space by connecting objects corresponding to the object information with a line from the generated road profile map.

6. The system of claim 5, wherein the distance information comprises information detected by the distance measuring sensor, the distance measuring sensor comprising one or both of an ultrasonic sensor and a laser scanner.

7. The system of claim 5, wherein the object information comprises information detected by the object detecting sensor, the object detecting sensor comprising one or both of a camera sensor and a radar sensor.

8. The system of claim 5, wherein the movement information comprises steering angle information detected by a steering angle sensor, vehicle speed information detected by a vehicle speed sensor, vehicle position information detected by a vehicle position sensor, and brake force information detected by a brake sensor.

9. The system of claim 5, wherein the generating of the road profile map comprises generating the vehicle-drivable space by connecting objects at a front-left side of the vehicle on the road profile map with a first line, and by connecting objects at a front-right side of the vehicle on the road profile map with a second line such that the vehicle-drivable space comprises the space between the first and second lines.

10. The system of claim 1, wherein the extracting of the dynamic driving space further comprises:
expressing the coordinate values indicating the calculated movement trace with one line in a common coordinate system expressing the vehicle-drivable space by referring to a coordinate conversion table, and expanding the one line into the two lines spaced by the width of the vehicle.

11. A method of guiding safe driving of a vehicle by a safe driving guiding system, the method comprising:
extracting a vehicle-drivable space using distance information between the vehicle and an object detected by a distance measuring sensor and object information detected by an object detecting sensor, as the vehicle is driven;
extracting a dynamic driving space using movement information of the vehicle detected by a movement detecting sensor; and
determining an overlap degree between the vehicle-drivable space and the dynamic driving space, and controlling initiation of an operation of one or both of a lane departure warning system and a lane keeping assistance system based on the overlap degree,
wherein the extracting of the dynamic driving space comprises calculating a movement trace of the vehicle using the movement information, expressing coordinate values of two lines, based on the movement trace and spaced by a width of the vehicle, and extracting a space between the two lines as the dynamic driving space.

12. The method of claim 11, wherein the controlling comprises, in response to the dynamic driving space being completely included in the vehicle-drivable space based on the overlap degree, controlling the lane keeping assistance system to be in an operation standby state.

13. The method of claim 11, wherein the controlling comprises, in response to a partial area of the dynamic driving space being included in the vehicle-drivable space and the partial area being equal to or larger than a predetermined area according to the overlap degree, instructing an operation of the lane departure warning system.

14. The method of claim 11, wherein the controlling comprises, in response to a partial area of the dynamic driving space being included in the vehicle-drivable space and the partial area being smaller than a predetermined area according to the overlap degree, instructing an operation of the lane keeping assistance system.

15. A system of a vehicle for guiding safe driving of the vehicle, comprising:
an object detecting sensor configured to detect object information of an object;
a distance measuring sensor configured to periodically detect distance information;
a movement detecting sensor configured to detect movement information of the vehicle;
one or more processors configured to:
extract a vehicle-drivable space using the distance information from the vehicle to the object and the object information;
extract a dynamic driving space using the movement information; and
determine an overlap degree between the vehicle-drivable space and the dynamic driving space, and control initiation of an operation of one or both of a lane departure warning system and a lane keeping assistance system,
indicate the distance information and the object information in a common coordinate system by referring to a coordinate conversion table, and configuring mapping information comprising the distance information and the object information closest to the distance information in the common coordinate system;
select mapping information comprising the distance information and the object information closest to the distance information among the mapping information configured by the information mapping unit;
generate a road profile map using the distance information and the object information included in the selected mapping information, and extract the vehicle-drivable space by connecting objects corresponding to the object information with a line from the generated road profile map; and
storage configured to store the coordinate conversion table.

16. The system of claim 15, wherein the distance information comprises information detected by the distance measuring sensor, the distance measuring sensor comprising at least one of an ultrasonic sensor and a laser scanner.

17. The system of claim 15, wherein the object information comprises information detected by the object detecting sensor, the object detecting sensor comprising at least one of a camera sensor and a radar sensor.

18. The system of claim 15, wherein the movement information comprising steering angle information detected by a steering angle sensor, vehicle speed information detected by a vehicle speed sensor, vehicle position information detected by a vehicle position sensor, and brake force information detected by a brake sensor.

19. The system of claim 15, wherein the generating of the vehicle-drivable space comprises connecting objects at a front-left side of the vehicle on the road profile map with one line, and connecting objects shown at a front-right side of the vehicle on the road profile map with another line.

20. The system of claim 15, wherein the extracting of the dynamic driving space comprises:
   calculating a movement trace of the vehicle using the movement information; and
   expressing coordinate values indicating the calculated movement trace with one line in a common coordinate system expressing the vehicle-drivable space by referring to a coordinate conversion table, expanding the one line into two lines spaced by a width of the vehicle, and extracting a space between the two lines as the dynamic driving space.

* * * * *